Jan. 8, 1924.
A. S. KROTZ
1,479,994
TRACTOR PLOW
Filed Aug. 27, 1917
2 Sheets-Sheet 1
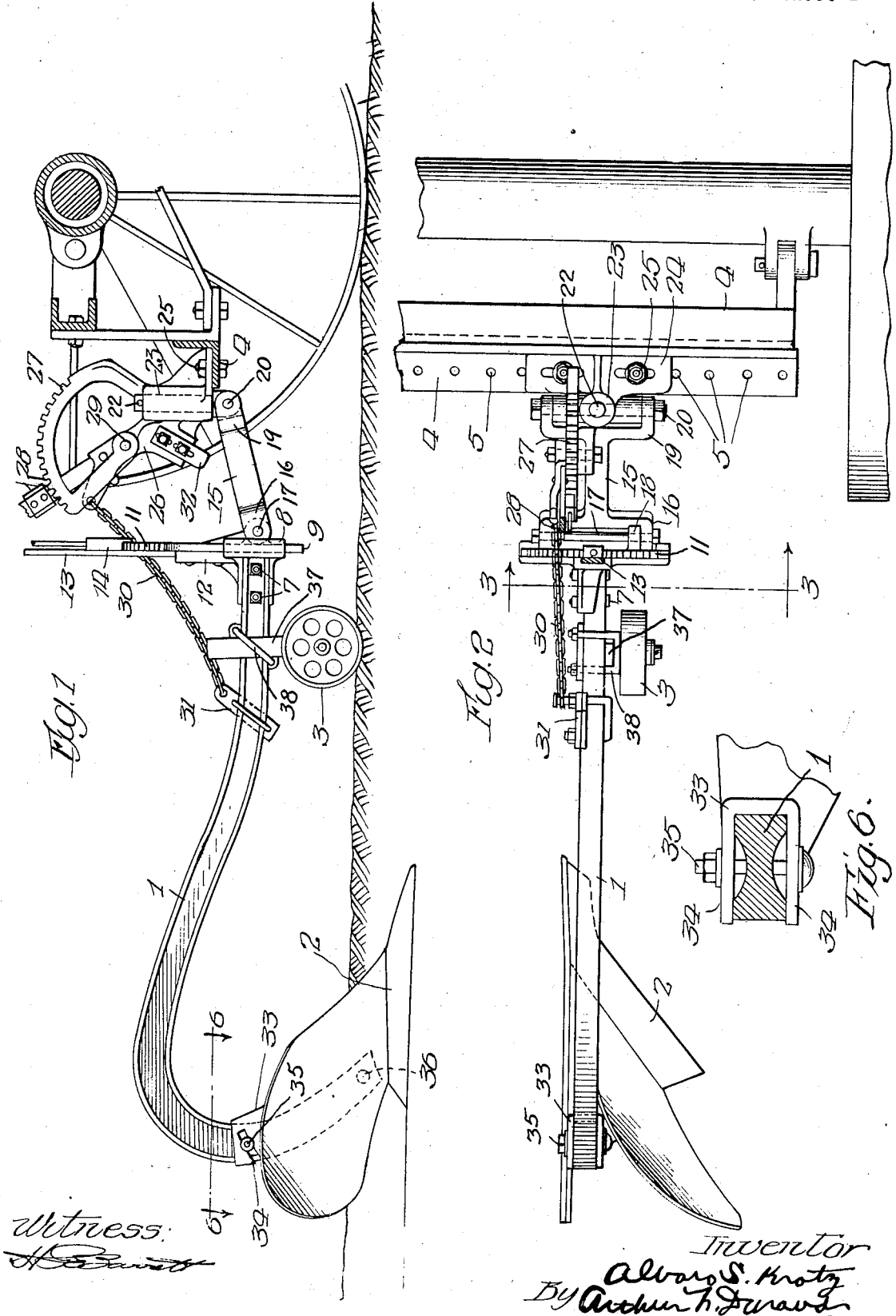

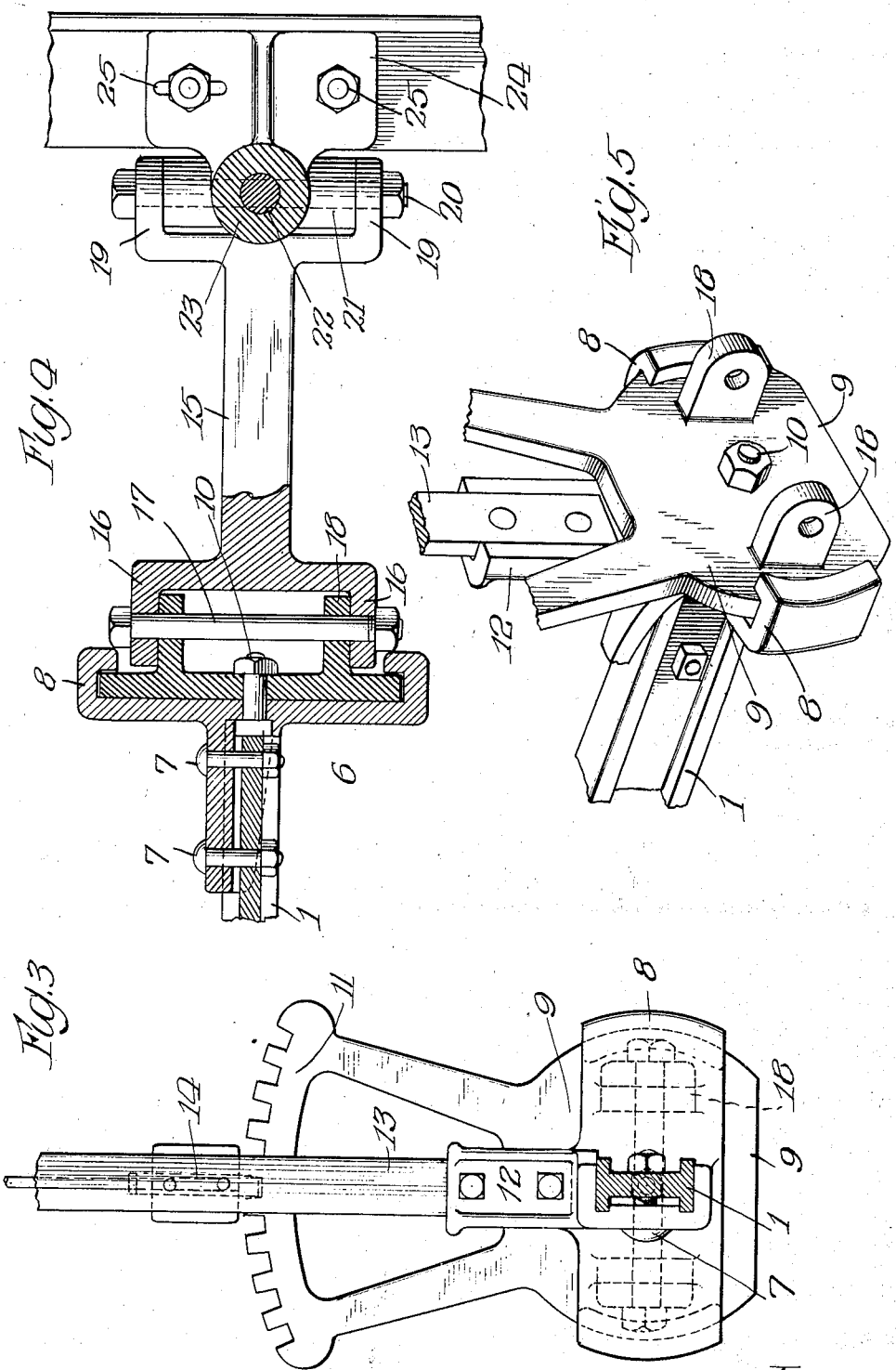

Patented Jan. 8, 1924.

1,479,994

UNITED STATES PATENT OFFICE.

ALVARO S. KROTZ, OF JANESVILLE, WISCONSIN.

TRACTOR PLOW.

Application filed August 27, 1917. Serial No. 188,269.

*To all whom it may concern:*

Be it known that I, ALVARO S. KROTZ, a citizen of the United States of America, and resident of Janesville, Wisconsin, have invented a certain new and useful Improvement in Tractor Plows, of which the following is a specification.

My invention relates to plows for use more particularly in connection with tractors, and more especially to the connecting mechanism between the plow and the tractor, as well as the means for raising and lowering and adjusting the position of the plow.

Generally stated, the object of my invention is to provide a novel and improved arrangement for connecting the plow with the rear end of a tractor, and for raising and lowering the plow and adjusting the position thereof, thereby to facilitate the operation and handling of the plow in the field.

A special object is to provide an improved construction and arrangement, whereby an ordinary hand or walking plow can be connected to a tractor and employed in this manner with satisfactory results.

It is also an object to provide certain details and features of construction and combinations tending to increase the general efficiency and desirability of a tractor plow arrangement of this particular character.

To the foregoing and other useful ends, my invention consists in matters hereinafter set forth and claimed.

In the accompanying drawings, Figure 1 is a side elevation of a tractor plow construction, embodying the principles of my invention.

Figure 2 is a plan of the structure shown in Figure 1.

Figure 3 is an enlarged vertical section on line 3—3 in Figure 2.

Figure 4 is an enlarged sectional plan view of the connecting means between the plow and the tractor.

Figure 5 is a perspective of the parts which are mounted on the forward end of the plow beam.

Figure 6 is a detail section, on a larger scale, on line 6—6 in Figure 1.

As thus illustrated, my invention comprises an ordinary plow beam 1, having the usual plow bottom 2 secured thereto. As the plow is to be used with a tractor, no handles are shown. Also, the usual draft connections for the forward end of the plow beam, by which the plow is hitched to a team of horses, have been removed and are not shown. But the ordinary depth or gauge wheel 3 is shown on the forward portion of the plow beam.

The tractor may be of any suitable known or approved form or construction, but its frame or body is preferably provided at the rear end thereof with a transverse angle iron 4, provided with a series of openings 5 in the horizontal web thereof. In Figures 1 and 2, a portion of one of the rear wheels of the tractor is shown, and it will be understood that the rear end of the tractor is provided with a seat for the driver.

The connection between the plow and the tractor is as follows: A casting or bracket 6 is secured by bolts 7, or in any suitable manner, to the forward portion of the plow beam. This bracket or casting is provided with curved guides 8 at opposite sides thereof, and the draft connection comprises a plate 9 which fits in said guides, and which is mounted to turn on the horizontal bolt 10, the latter being inserted through the central portion of the plate and through the central portion of the bracket 6, whereby the plate 9 is mounted to oscillate about a horizontal axis. The draft is not entirely on said bolt 10, but is sustained by the guides 8 as well. The plate 9 is provided with a toothed rack or segment 11, at the top thereof, and the bracket 6 is provided with an upstanding socket portion 12 in which is secured a vertically disposed hand lever 13 provided with a locking device 14, of the usual character, and controlled in the well known manner, to engage the notches of the segment 11, whereby the plow beam is normally locked to the plate 9 of the draft connection. When the device 14 is disengaged from the rack or segment 11, the hand lever 14 can then be employed for tilting or rolling the plow over sidewise, in either direction, and the plow can then be locked in such adjusted position. The draft link 15 is provided at its rear end with spaced arms 16 through which a transverse bolt 17 is inserted, this bolt also extending through the ears 18 on the rear surface of the plate 9, whereby the link 15 can swing up and down relative to said plate. The forward end of the link 15 is provided with similar spaced arms 19, in which a bolt 20 is inserted, and this bolt also extends horizontally through the bearing 21 which is rigid with the lower end of the pivot 22, so that the link 15 can swing laterally and also up and down relative to the tractor. The pivot 22 is mounted to turn about a vertical axis in the bearing 23, which is rigid with the bracket plate 24, and the latter is provided with bolts 25 by which it is clamped upon the angle iron 4, said bolts 25 being inserted through slots in the bracket plate 24, as shown, and through the openings 5 in said angle iron. The angle iron 4 may be of any suitable length, and can extend, for example, the full width of the tractor, and in this way means are provided for variably connecting the draft mechanism of the plow and the rear end of the tractor. This facilitates the connection of the plow with the tractor, as it does not require the connection of the plow to a particular point on the tractor frame, but to the contrary enables the driver to connect the plow to any one of several points (whichever one is nearest and most convenient) on the rear end of the tractor. In this way, the tractor can be backed up to the mechanism on the forward end of the plow beam, and the plate 24 can then be attached by inserting the bolts 25 through the nearest pair of holes 5, and an exact alignment of the tractor and plow is thus made unnecessary. The forward end of the plow beam, it will be seen, has a free up and down floating action, as the draft link 15 swings up and down freely, and the vertical pivot 22 permits the plow to swing laterally in a free and unrestricted manner.

To raise and lower the plow, the following means are provided: The bearing 23 is provided with a rearwardly extending bracket 26, and with a curved rack or toothed segment 27, the latter being disposed in a vertical longitudinal plane. A hand lever 28 is pivoted at 29 on said bracket 26, and is provided with a flexible connection 30 which leads to the attaching device 31 on the plow beam, so that when said hand lever is swung forward toward the tractor, the forward portion of the plow beam will be raised. This action will continue until the link 15 engages the adjustable stop 32 on the bracket 26, and then the rear end of the plow beam and the plow bottom will swing upward about the axis provided by the bolt 17, this axis being held stationary during this final lifting of the plow from the ground. The hand lever 28, of course, is provided with a suitable device for engaging the rack or segment 27, so that the hand lever can be locked in any of its adjusted positions, thereby to hold the plow in raised position.

From the seat on the rear end of the tractor, the operator or driver can manipulate the levers 13 and 28 to control the plow and the latter will leave and enter the ground point first, in the well known and approved manner. The gauge wheel 3 is, of course, adjustably connected with the forward portion of the beam 1, so that the wheel can be adjusted up and down on said beam, thereby to regulate the depth of the furrow. This, of course, can be done by any suitable or well known means.

As shown on Figure 6, the frog or rear portion 33 of the plow is formed with slots 34, at opposite sides thereof, to engage the clamping bolt 35, and the lower end of the beam has a pivot bolt 36 to connect the plow-bottom to the beam. With this arrangement, should the plow strike a rock or snag, the draft mechanism of the plow will not be broken, as the plow-bottom will tilt forward about the pivot bolt 36 (see dotted lines in Figure 1, the friction grip which the portion 33 has on the beam being sufficient to hold the plow-bottom in position against the ordinary pressure of the soil, but not enough to hold when the plow strikes an unyielding obstruction. This, therefore, protects the draft mechanism between the plow and the tractor against breakage.

The gauge wheel 3, it will be seen, is approximately in line with the longitudinal center line to the plow-bottom, so that the plow does not rise and fall when the tractor tilts to one side or the other, and whereby the depth of the furrow is not changed by the sidewise tilt or rolling motion of the tractor. The plow, by reason of the character of the draft mechanism, is held by the tractor against tipping over sidewise, so that the position of the plow in this respect is controlled by the tractor. On the other hand however, the front end of the plow beam has a free floating connection with the tractor, so that the plow will operate in the desired manner and the required depth, notwithstanding the pitching motion of the tractor—that is to say, the up and down motion of the front end of the tractor relative to its rear end, which takes place when the tractor travels over uneven ground. At the same time, however, the plow can be tilted over sidewise relative to the tractor, when such is necessary or desirable.

In the construction shown and described, the link 15 has the double function of holding the plow against tilting sidewise, and of providing a floating connection, but it will be understood that separate elements can be used for these different functions, if desired, and the invention is not limited to the exact construction shown and described.

Preferably, the vertical pivot 22, about which the plow swings laterally, is arranged as close to the axis of the rear tractor wheels as possible, so that this pivot 22 will not be shifted sidewise, or will only have a minimum of such lateral shift, when the front wheels of the tractor turn to the right or left.

When the plow is on the ground, it will be seen that the forward end of the plow-beam is supported entirely by the wheel 3, so that no weight is imposed on the draft connection 15 or on the lifting connection 30, whereby the depth of the furrow is governed accordingly. The point of attachment of the connection 30 with the plow-beam is of such a character and so located that the plow when raised, tends to tilt downward at its rear end, inasmuch as the greater portion of the weight of the plow is behind the clamping or fastening means 31 by which the chain 30 is connected to the plow-beam. In this way, the plow comes out of the ground point first, as explained, and may then trail along on top of the ground before it is swung upward; but the further operation of the hand lever 28, after the draft connection 15 engages the stop 32, then holds the front end of the plow against further upward movement, and confines the lifting action to the rear end of the plow, so that the weight of the rear end of the plow serves to hold the draft connection 15 in raised position.

The wheel 3, it will be seen, has the upright 37 which is clamped in place by the clamp or fastening device 38, so that the beam 1 can be adjusted up and down on the upright or shank 37 to change the depth of the furrow.

It will be observed that the plow is of an unstable character, while the tractor, of course, is a stable affair and can stand alone on the front and rear wheels thereof, whereby the plow is dependent upon the tractor, so far as tipping sidewise is concerned, inasmuch as the plow is both held against sidewise tipping by the tractor, and is also tilted sidewise when the tractor leans over sidewise in either direction, while traveling over uneven ground. Moreover, the direct draft connection between the plow and the tractor permits the tractor to turn to the right or left without any danger of binding, and the plow must always follow the tractor, the depth wheel 3 being the first thing which engages the ground in rear of the tractor, and there being no trailer of any kind between the plow and the tractor. This reduces the cost of a plow outfit of this character, very materially, and makes it possible to use a direct raising and lowering means, and in addition the plow will follow the tractor around curves without running into the furrow or cutting too wide, and the tractor can be turned and backed while the plow is being raised, which is impractical in a construction where a trailer or a separate carrying unit is interposed between the plow and the tractor. The entire weight of the plow is carried, of course, by the tractor itself when the plow is raised from the ground, inasmuch as the rigid support 4 is carried by the rear end of the tractor, and the plow and the raising and lowering means are carried on this support when the plow is raised out of the ground. The element 37, of course, is rigid with the forwardly extending plow beam 1, to which latter the plow bottom 2 is rigidly connected, so that the depth wheel 3 has a horizontal axis disposed in fixed relation to the plow, but the relation of this axis to the plow may be changed by the adjusting means 38 previously described, in a manner that will be readily understood. Also, of course, the hand lever 13 by which the plow is tilted or tipped over sidewise in either direction, is rigid with the plow beam and plow, as shown and described.

What I claim as my invention is:

1. In a plowing machine, the combination of a plow consisting of a beam structure and a soil turning device mounted thereon, said plow provided with a single depth regulating wheel at the front end thereof to travel on the ground, means to adjust the front end of said plow up and down on the wheel to change the depth of the furrow, a self contained tractor for pulling the plow, and a draft connection from the tractor to the forward end of the plow, provided with flexible connections at both ends, whereby the plow can swing sidewise and trail behind the tractor, but is self contained so far as depth and horizontal position is concerned, and is held in upright position by the tractor, and means for tilting the plow relative to the tractor.

2. A structure as specified in claim 1, said depth regulating wheel adapted to carry the rear end of said draft connection and the front end of said plow.

3. A structure as specified in claim 1, and means for raising said plow clear of the ground, comprising a stop to limit the raising of the front end of said plow, a flexible raising connection adapted to lift the front end of the plow first and until said stop is engaged, after which the rear end of the plow is lifted clear of the ground, whereby the plow will enter and leave the ground point first.

4. An unstable tractor plow comprising a beam and plow bottom, a stable tractor provided with a support carried by the tractor at the rear end thereof, a draft link connection disposed directly between the plow beam and the support, means providing the front and rear ends of said connection with horizontal pivots, and the front end with a vertical pivot, so that the rear end of the draft link is adapted to swing up and down and laterally in relation to the tractor and up and down in relation to the plow, a depth wheel mounted independently of said draft link adjacent the front end of said beam to carry the same, whereby the furrow depth is controlled by said wheel and the upright position of the plow thus controlled by said tractor is independent thereof, except as to sidewise tipping with the tractor, as and for the purpose specified.

5. A structure as specified in claim 4 and means on the beam for adjusting the depth wheel and means on the beam for adjusting the upright position of the plow relatively to the tractor.

6. A structure as specified in claim 4 and a stop for limiting the upward movement of the draft link, and a lifting means connected between the front end of the beam and the plow bottom, whereby the depth wheel is first lifted from the ground and then the plow bottom is so lifted that it comes out point first and is free to enter the ground point first when the raising means is released.

7. A structure as specified in claim 4, in combination with raising and lowering mechanism mounted on said draft connection between the plow beam and said rear support, and a connection from said mechanism to the plow beam, so that the weight of the plow when raised is carried entirely by said rear support.

8. A structure as specified in claim 4, in combination with adjusting means including a hand lever rigid with the plow beam, and a rack rigid with an element of the draft connection and means on the hand lever for engaging said rack whereby the plow may be tilted sidewise at will and held in adjusted position.

9. A structure as specified in claim 4, said rear support comprising a transverse bar which is rigid with the frame of the tractor, and means whereby said vertical pivot is adjustable laterally on said bar toward either side of the tractor.

10. An unstable tractor plow comprising a beam and plow bottom, a stable tractor provided with a support carried by the tractor at the rear end thereof, a draft link connection disposed directly between the plow beam and the support, means providing the front and rear ends of said connection with horizontal pivots, and the front end with a vertical pivot, so that the rear end of the draft link is adapted to swing up and down and laterally, a depth wheel mounted adjacent the front end of said beam and adapted to carry the same, whereby the furrow depth is controlled by said wheel and the vertical position of the plow thus controlled by said tractor is independent thereof, except as to sidewise tipping, as and for the purpose specified, in combination with adjusting means including a hand lever rigid with the plow beam, and a rack rigid with an element of the draft connection and means on the hand lever for engaging said rack whereby the plow may be tilted sidewise at will and held in adjusted position.

11. An unstable tractor plow comprising a beam and plow bottom, a stable tractor provided with a support carried by the tractor at the rear end thereof, a draft link connection disposed directly between the plow beam and the support, means providing the front and rear ends of said connection with horizontal pivots, and the front end with a vertical pivot, so that the rear end of the draft link is adapted to swing up and down and laterally, a depth wheel mounted adjacent the front end of said beam and adapted to carry the same, whereby the furrow depth is controlled by said wheel and the vertical position of the plow thus controlled by said tractor is independent thereof, except as to sidewise tipping, as and for the purpose specified, said rear support comprising a transverse bar which is rigid with the frame of the tractor, and means whereby said vertical pivot is adjustable laterally on said bar toward either side of the tractor.

Signed by me at Chicago, Illinois, this 20th day of August, 1917.

ALVARO S. KROTZ.